(No Model.)
P. WHITE.
VALVE.
No. 270,355. Patented Jan. 9, 1883.
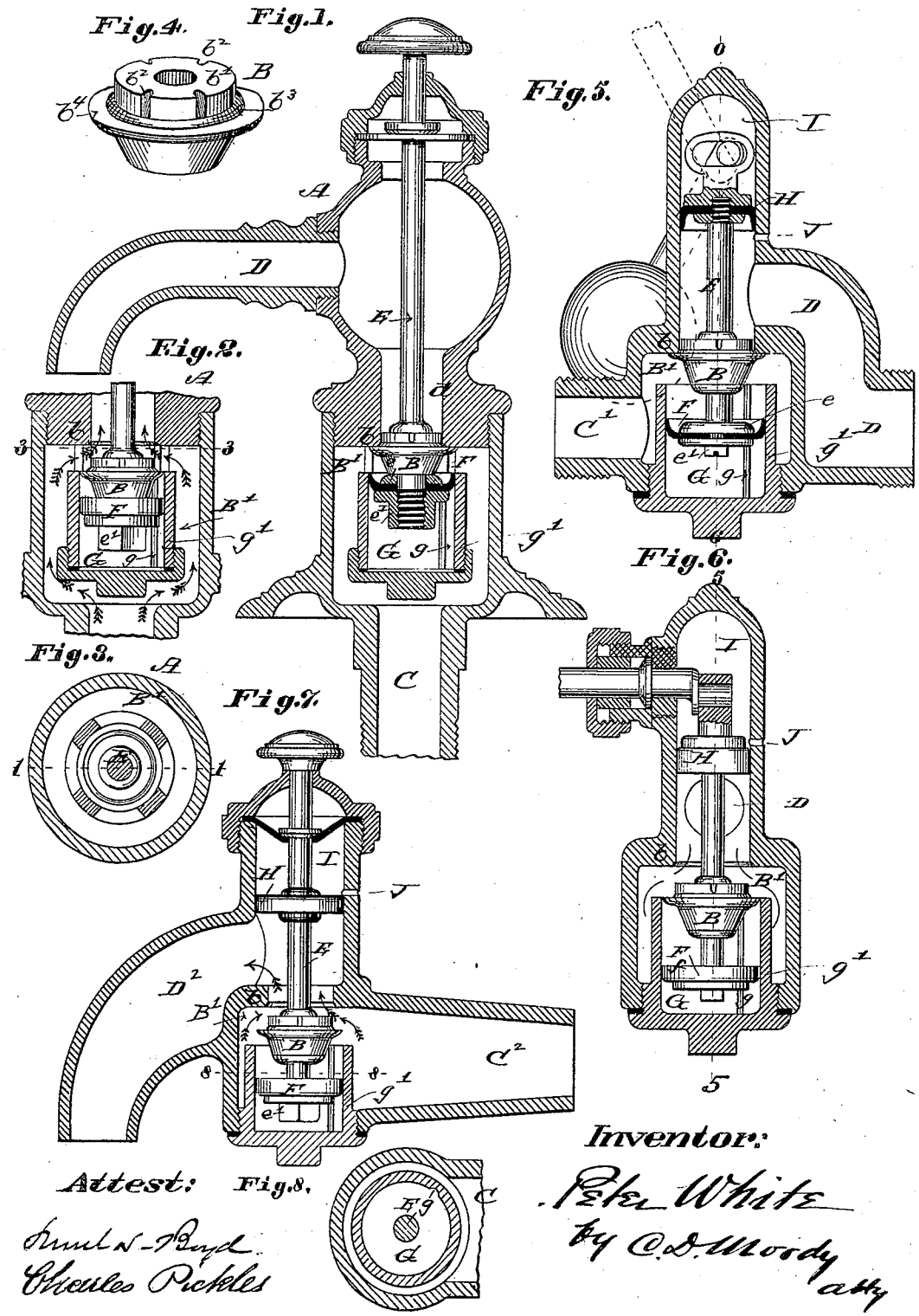
Attest:
Saml N. Boyd
Charles Pickles
Inventor:
Peter White
by C. D. Moody
atty
N. PETERS, Photo-Lithographer, Washington, D. C.

UNITED STATES PATENT OFFICE.

PETER WHITE, OF ST. LOUIS, MISSOURI.

VALVE.

SPECIFICATION forming part of Letters Patent No. 270,355, dated January 9, 1883.

Application filed May 1, 1882. (No model.)

*To all whom it may concern:*

Be it known that I, PETER WHITE, of St. Louis, Missouri, have made a new and useful Improvement in Valves, of which the following is a full, clear, and exact description, reference being had to the annexed drawings, making part of this specification, in which—

Figure 1 is a vertical section of the improved valve, taken on the line 1 1 of Fig. 3; Fig. 2, a vertical section showing the valve opened; Fig. 3, a horizontal section taken on the line 3 3 of Fig. 2; Fig. 4, a view in perspective of the valve; Fig. 5, a vertical section, showing a modification of the valve, taken on the line 5 5 of Fig. 6; Fig. 6, a vertical section taken on the line 6 6 of Fig. 5; Fig. 7, a vertical section showing a modification of the valve, and Fig. 8 a horizontal section taken on the line 8 8 of Fig. 7.

The same letters denote the same parts.

The present invention relates to the improved means for retarding the closing of the valve.

A, Figs. 1, 2, 3, represents one form of valve having the improvement in question, the valve being self-closing and the particular form shown being a basin-valve.

B represents the valve, closing upward, or in the direction of the discharge from the valve, the valve-seat being at $b$ and the water entering the valve below the seat, say, through the inlet C, and being discharged from the valve, say, through the outlet D.

The valve-stem E is extended below the valve B, and is furnished with a cup-leather, F, the latter being secured to the stem by means of a suitable washer, $e$, and nut $e'$.

The cup-leather F works upward and downward in a chamber, G, the flange $f$ of the leather being turned upward and against the wall of the chamber G, fitting the wall closely saving opposite the shallow recess $g$, through which the water in small quantity can pass into the chamber G beneath the cup-leather.

In place of the recess $g$, the wall $g'$ of the chamber G may be perforated, the perforation being below the cup-leather when the latter is at its lowest point in the chamber G.

The chamber G is supported in the valve-chamber B' by any suitable means. In Figs. 1, 2, it is shown suspended from the upper part of the valve-chamber. However supported, the construction should be such as to enable the water to pass through the valve-chamber, and also to enter in minute quantity to beneath the cup-leather in the chamber G.

In Fig. 2 the valve is shown open. On releasing the downward pressure upon the valve-stem E, the valve B closes upon the seat $b$, the escaping water acting to draw the valve against the seat. The valve would close suddenly were it not for the cup-leather F. The water-pressure above the latter causes the upward movement of the valve-stem and valve to be retarded, and sufficiently to obviate the difficulty arising from the valve being closed at once. The upward movement of the valve-stem and valve would, however, be arrested if the water could not pass to beneath the cup-leather; but through the recess $g$ enough water can so pass to enable the cup-leather and valve-stem to slowly rise and the valve B to close.

In Figs. 5 and 6 the improvement is modified, in that the inlet C' is at the side of the chamber G, the chamber G is supported from the bottom, and the mechanism for depressing the valve-stem is modified.

In Figs. 7 and 8 another modification is shown, the inlet $C^2$ being at the side of the chamber G, and the outlet $D^2$ being as for a bib-cock.

In the last two named constructions the valve-stem E may be furnished with a cup-leather, H, for the purpose of closing the water from the chamber I above the cup-leather.

The outlet J is for the escape of water from above the valve B when the outlet D is extended to a remote point.

The valve B has an extension, $b'$, which is notched at $b^2$ to prevent the valve from closing too abruptly. The valve is beveled at $b^3$ to facilitate the seating of the valve. The valve is also furnished with a thin flexible edge, $b^4$, for the purpose of closing the valve in case the inner portion of the valve-seat becomes worn.

I claim—

1. The combination of the chamber B' with the chamber G, having the recess $g$, the valve B, the stem E, and the cup-leather F, substantially as described.

2. The combination, in a valve having the inlet C and the outlet D, of the chamber B' G, with the valve B, the stem E, and the cup-leather F, substantially as described.

3. In combination with the passage $c$ and seat $b$, the valve B, having the extension $b'$, notched at $b^2$ and beveled at $b^3$, substantially as described.

4. The combination of the valve-seat $b$, the stem E, and the valve B, having the bevel $b^3$ and the flexible edge $b^4$, substantially as and for the purpose set forth.

PETER WHITE.

Witnesses:
C. D. MOODY,
CHARLES PICKLES.